(12) United States Patent
Furusawa et al.

(10) Patent No.: US 9,028,148 B2
(45) Date of Patent: May 12, 2015

(54) MOTION GUIDE DEVICE (71) Applicant: THK Co., Ltd., Tokyo (JP)

(72) Inventors: Ryuji Furusawa, Tokyo (JP); Takuya Horie, Tokyo (JP); Satoshi Kashiwagura, Tokyo (JP); Mitsumasa Wada, Tokyo (JP); Shinya Mori, Tokyo (JP); Yuki Nakamura, Tokyo (JP); Yosuke Irie, Tokyo (JP); Masanori Yoshino, Tokyo (JP); Shinya Saito, Tokyo (JP); Teruaki Ooka, Tokyo (JP); Marie Horikawa, Tokyo (JP)

(73) Assignee: THK Co., Ltd., Tokyo (JP)

( * ) Notice: Subject to any disclaimer, the term of this patent is extended or adjusted under 35 U.S.C. 154(b) by 0 days.

(21) Appl. No.: 14/351,401

(22) PCT Filed: Oct. 22, 2012

(86) PCT No.: PCT/JP2012/077194
§ 371 (c)(1),
(2) Date: Apr. 11, 2014

(87) PCT Pub. No.: WO2013/069439
PCT Pub. Date: May 16, 2013

(65) Prior Publication Data
US 2014/0301677 A1    Oct. 9, 2014

(30) Foreign Application Priority Data

Nov. 9, 2011 (JP) .................................. 2011-245573

(51) Int. Cl.
*F16C 29/06* (2006.01)
*F16C 33/72* (2006.01)
(Continued)

CPC ...... *F16C 29/0602* (2013.01); *F16J 15/32* (2013.01); *F16J 15/3456* (2013.01); *F16C 33/76* (2013.01); *F16C 29/0642* (2013.01); *F16C 29/086* (2013.01); *F16C 29/088* (2013.01)

(52) U.S. Cl.
(58) Field of Classification Search
CPC ............. F16C 29/0647; F16C 29/0609; F16C 29/0611; F16C 29/086; F16C 29/088; F16C 33/76; F16C 33/7823; F16J 15/32; F16J 15/3456
USPC .......................................... 384/15, 43–45, 49
See application file for complete search history.

(56) References Cited

U.S. PATENT DOCUMENTS 5,492,412 A * 2/1996 Tsukada .......................... 384/15
5,588,750 A * 12/1996 Osawa et al. .................... 384/45
(Continued)

FOREIGN PATENT DOCUMENTS

JP    07-305722 A    11/1995
JP    7-310745    * 11/1995    .............. F16C 29/06
(Continued)

OTHER PUBLICATIONS

International Search Report for PCT/JP2012/077194, Mailing Date of Nov. 13, 2012.

*Primary Examiner* — Marcus Charles
(74) *Attorney, Agent, or Firm* — Westerman, Hattori, Daniels & Adrian, LLP (57) ABSTRACT

A motion guide device including a track shaft having a rolling surface; a moving member movable along the track shaft; a first seal member in sliding contact with a surface of the track shaft to close a gap between the track shaft and the moving member; and a second seal member provided along the rolling surface of the track shaft and closes the gap between the track shaft and the moving member. The second seal member includes: a fixing substrate locked to the moving member; and a seal portion fixed to the fixing substrate along the rolling surface of the track shaft and includes a seal lip portion in sliding contact with the surface of the track shaft and an extended seal portion in close contact with the first seal member while being compressed by the first seal member when the first seal member is fixed to the moving member.

2 Claims, 11 Drawing Sheets

(51) Int. Cl.
*F16J 15/34* (2006.01)
*F16J 15/32* (2006.01)
*F16C 33/76* (2006.01)
*F16C 29/08* (2006.01)

(56) References Cited

U.S. PATENT DOCUMENTS

| | | | |
|---|---|---|---|
| 5,871,282 A * | 2/1999 | Yuasa | 384/15 |
| 6,113,272 A | 9/2000 | Michioka et al. | |
| 7,950,852 B2 * | 5/2011 | Kondo | 384/45 |
| 2003/0215166 A1 * | 11/2003 | Matsumoto | 384/45 |
| 2008/0279489 A1 * | 11/2008 | Kondo | 384/15 |

FOREIGN PATENT DOCUMENTS

| | | | | |
|---|---|---|---|---|
| JP | 11-336758 A | | 12/1999 | |
| JP | 2000018244 A | * | 1/2000 | F16C 29/06 |
| JP | 2001227538 A | * | 8/2001 | F16C 29/04 |
| JP | 2003-254329 A | | 9/2003 | |
| JP | 2004036643 A | * | 2/2004 | F16C 29/08 |
| JP | 2006-170279 A | | 6/2006 | |
| JP | 2007205559 A | * | 8/2007 | |

* cited by examiner

MOTION GUIDE DEVICE

TECHNICAL FIELD

The present invention relates to a motion guide device in which a moving block is assembled to a track rail through intermediation of a large number of endlessly circulating rolling elements such as balls and rollers, to thereby enable free reciprocating motion of an article fixed and mounted onto the moving block along the track rail.

BACKGROUND ART

As the above-mentioned motion guide device, there is known a motion guide device including a track rail having a rolling surface for balls formed along its longitudinal direction, and a moving block that is assembled to the track rail through intermediation of the balls rolling on the rolling surface and has an endless circulation path for the balls. The moving block includes a block main body and a pair of lid members. The block main body has a load rolling surface that is opposed to the rolling surface of the track rail to form a load ball path for the balls, and a ball return hole for circulating the balls. The pair of lid members is fixed to both front and rear end surfaces of the block main body. The balls are circulated through the endless circulation path for the balls, which is provided in the moving block, and thus the moving block can continuously move along the longitudinal direction of the track rail.

In the motion guide device configured as described above, depending on the usage environment, foreign matters such as chips of a workpiece or refuse may adhere to the track rail. If those foreign matters enter the moving block running along the track rail, flaws may be generated in a rolling surface of the track rail, a load rolling surface of the moving block, or in the balls, or abrasion of those members may be accelerated. As a result, a movement accuracy of the moving block in the motion guide device may be impaired in an early stage.

For such reasons, in general, a pair of end seals is mounted to the moving block at both ends in a moving direction thereof. Each of the end seals includes a seal lip portion that comes into sliding contact with the surface of the track rail, and when the moving block moves along the track rail, the seal lip portion wipes the foreign matters adhering on the track rail off the surface of the track rail, thereby preventing the foreign matters from entering the moving block.

Further, inside the moving block, from the viewpoint of preventing foreign matters from entering particularly the load ball path for the balls, in general, a pair of inner seals is mounted to the moving block at positions opposed to the upper surface of the track rail, while a pair of side seals is mounted to the moving block at positions opposed to side surfaces of the track rail. Each of the inner seals and the side seals includes a seal lip portion provided along the longitudinal direction of the moving block, and the seal lip portion comes into sliding contact with the surface of the track rail similarly to the end seal.

The pair of end seals is fixed with fixing bolts to both end surfaces of the moving block in its moving direction, that is, outer side surfaces of the lid members, while the inner seal and the side seal are fixed to the moving block under a state in which both longitudinal ends thereof are retained by the pair of lid members. Further, as different means for fixing those inner seal and side seal to the moving block, as disclosed in Patent Literature 1, there is known means for forming recessed portions in the pair of end seals to be fixed to the moving block, and inserting the inner seal and the side seal through the recessed portions, to thereby retain the inner seal and the side seal between the pair of end seals.

CITATION LIST

Patent Literature

[PTL 1] JP 2006-170279 A

DISCLOSURE OF THE INVENTION

Problems to be Solved by the Invention

However, in the fixing means as disclosed in Patent Literature 1 that supports both the longitudinal ends of each of the inner seal and the side seal by the pair of end seals, when there is a tolerance in its processing in any one of the block main body, the lid member, the inner seal, and the side seal, a gap may be generated between the end seal and the inner seal, or between the end seal and the side seal. This is because the length of the inner seal or the side seal does not match with the distance between the outer side surfaces of the pair of lid members fixed to the block main body. This problem may occur even in such fixing means that both the ends of each of the inner seal and the side seal are supported by the pair of lid members.

In the motion guide device of this type, the track rail is fastened to a fixing portion such as a bed with use of fixing bolts in most cases, and thus the track rail has insertion holes for the fixing bolts formed therein in a penetrated manner. In the related-art motion guide device to be used in an environment having a large amount of foreign matters, the following measure has been taken to prevent foreign matters from entering the moving block through the insertion holes. That is, closing caps are filled in the insertion holes of the track rail so that the surface of the track rail with which the end seals are brought into sliding contact becomes a smooth surface without steps.

However, even when the closing caps are filled in the insertion holes, a fine step or gap is naturally generated at a boundary between the closing cap and the insertion hole, and fine foreign matters that may accumulate in those step and gap may not be wiped by the end seal located on the front side in the traveling direction of the moving block but may pass below the end seal. The foreign matters that have passed below the end seal as described above adhere on the inner side of the end seal located on the rear side in the traveling direction of the moving block, with the result that the fine foreign matters that have passed below the pair of end seals accumulate between those end seals.

When the motion guide device is continuously used under this state, the foreign matters gradually accumulate on the inner side of the end seal. Finally, there is a high risk that the foreign matters accumulated on the end seal enter the load ball path through a gap formed between the end seal and the inner seal, or between the end seal and the side seal. As a result, flaws may be generated in the rolling surface of the track rail, the load rolling surface of the moving block, or in the balls, or abrasion of those members may be accelerated. As a result, a movement accuracy of the moving block with respect to the track rail may be impaired in an early stage. Such entrance of foreign matters through the gap generated between the end seal and the inner seal or the side seal tends to occur even due to deterioration of the end seal caused by the long-term use of the motion guide device.

Means for Solving the Problems

The present invention has been made in view of the above-mentioned problem, and has an object to provide a motion guide device capable of suppressing generation of a gap between an end seal and an inner seal or between the end seal and a side seal, which are fixed to a moving block, and preventing foreign matters from entering a load ball path through the gap, to thereby prevent abrasion or damage on a rolling surface of a track rail, a load rolling surface of the moving block, or on a ball itself, and achieve a smooth motion of the moving block with respect to the track rail.

In order to attain the above-mentioned object, according to one embodiment of the present invention, there is provided a motion guide device, including: a track shaft having a rolling surface for rolling elements formed along a longitudinal direction thereof; a moving member that is assembled to the track shaft through intermediation of a large number of the rolling elements and has an endless circulation path for the rolling elements, the moving member being freely movable along the track shaft; a pair of first seal members that is mounted to both end surfaces of the moving member in a moving direction thereof and comes into sliding contact with a surface of the track shaft so as to close a gap between the track shaft and the moving member; and a second seal member that is provided along the rolling surface of the track shaft and comes into sliding contact with the surface of the track shaft so as to close the gap between the track shaft and the moving member.

Further, the second seal member includes: a fixing substrate locked to the moving member; and a seal portion that is firmly fixed to the fixing substrate along the rolling surface of the track shaft. The seal portion includes a seal lip portion that comes into sliding contact with the surface of the track shaft. The seal portion has both longitudinal ends that come into close contact with the pair of first seal members under a state in which the pair of first seal members is fixed to the moving member. The seal portion further includes a pair of extended seal portions that protrudes in a longitudinal direction of the fixing substrate from both longitudinal ends of the fixing substrate. In addition, the pair of extended seal portions is compressed under the state in which the pair of first seal members is fixed to the moving member.

Effects of the Invention in the motion guide device to which the present invention is applied as described above, when the pair of first seal members is fixed to the moving member, the extended seal portions provided at both ends of the seal portion of the second seal member are compressed by the first seal member, and both the ends of the seal portion of the second seal member are brought into close contact with the first seal member. Therefore, no gap is formed between the second seal member and the first seal member, and unlike the related-art motion guide device, foreign matters are prevented from entering the endless circulation path of the moving member through a gap between the second seal member and the first seal member. In addition, a smooth motion of the moving member with respect to the track shaft can be achieved.

MODE FOR CARRYING OUT THE INVENTION

Now, an example of a motion guide device to which the present invention is applied is described in detail with reference to the attached drawings.

Figure 1:
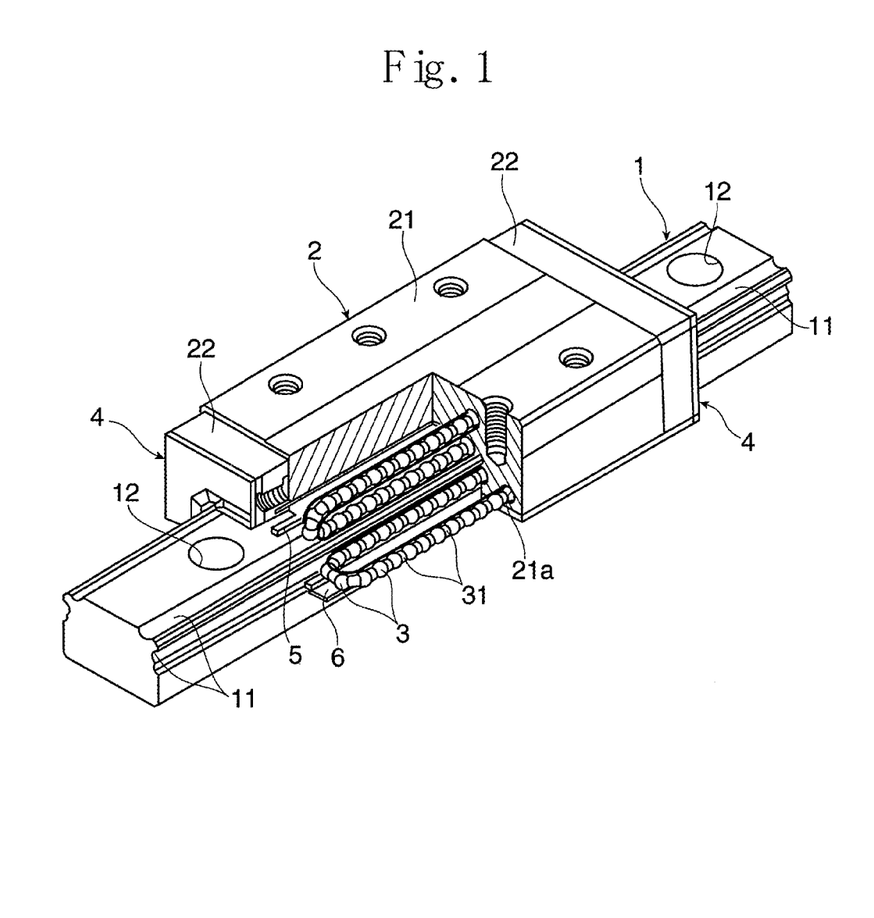
FIG. 1 is a perspective view illustrating an example of a motion guide device to which the present invention is applied.

FIG. 1 illustrates the motion guide device to which the present invention is applied. The motion guide device includes a linearly-formed track rail 1 serving as a track shaft, a moving block 2 serving as a moving member, which is assembled to the track rail 1 through intermediation of balls 3 serving as rolling elements and includes an endless circulation path for the balls 3 therein, end seals 4 serving as a pair of first seal members, which are fixed to both ends of the moving block 2 in its moving direction, and an inner seal 5 serving as a second seal member, for sealing the endless circulation path for the balls 3 in the moving block 2 from the outside of the motion guide device. When the balls 3 circulate in the endless circulation path of the moving block 2, the moving block 2 reciprocates on the track rail 1. Note that, in FIG. 1, for easier understanding of the internal structure of the moving block 2, a part thereof is illustrated in a cutout manner.

The track rail 1 is formed into a substantially rectangular shape in cross section, and two ball rolling surfaces 11 on which the balls 3 roll are formed in each side surface of the track rail 1 along its longitudinal direction. Further, the track rail 1 has insertion holes 12 formed therein in a penetrated manner at appropriate intervals in the longitudinal direction. Fixing bolts are inserted through the insertion holes 12 to fasten the track rail 1 to a fixing portion, such as a bed or a column, of various mechanical devices. After the fixing bolts are fastened to the fixing portion, closing caps (not shown) are filled in the insertion holes 12 so as to prevent accumulation of foreign matters. Note that, the track rail 1 of this embodiment has four ball rolling surfaces 11 formed therein, but the number of the ball rolling surfaces 11 and the arrangement thereof can be set and changed as appropriate depending on the application of the motion guide device and the magnitude of the load to be applied.

On the other hand, the moving block 2 includes a block main body 21, and a pair of lid members 22 fixed to both front and rear end surfaces of the block main body 21. The block main body 21 has load rolling surfaces that are opposed to the ball rolling surfaces 11 of the track rail 1 so as to form load ball paths for the balls 3, and ball return paths 21a for circulating the balls 3.

Figure 2:
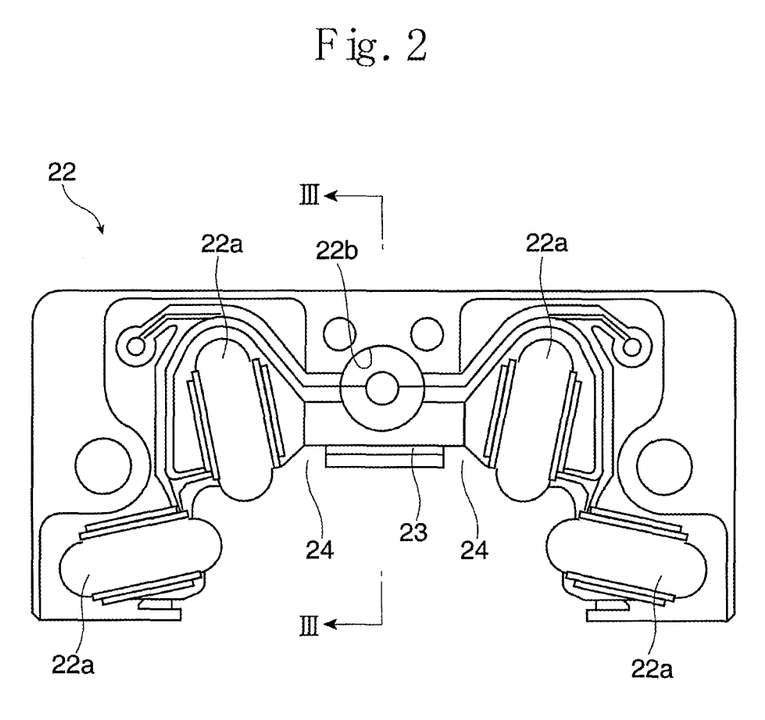
FIG. 2 is a front view illustrating a surface of a lid member illustrated in FIG. 1 that abuts against a block main body.
Figure 3:
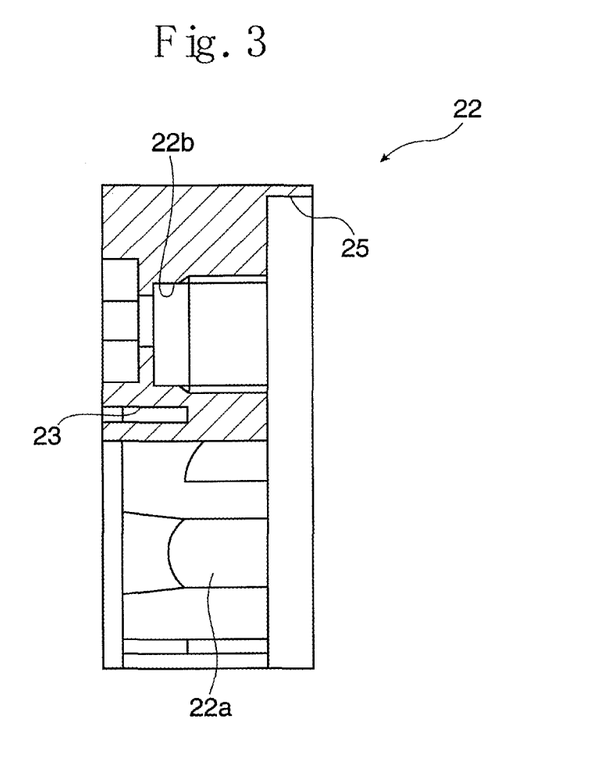
FIG. 3 is a sectional view taken along the line of FIG. 2.

FIGS. 2 and 3 illustrate the lid member 22. FIG. 2 illustrates a surface of the lid member 22 that abuts against the block main body 21, and FIG. 3 is a sectional view taken along the line of FIG. 2. The lid member 22 has direction changing paths 22a formed therein so as to scoop the balls 3 rolling through the load ball path while applying a load to supply the balls 3 into the ball return path 21a of the block main body 21, and supply the balls 3 rolling through the ball return path 21a in a non-load state into the load ball path. That is, the pair of lid members 22 is fixed to both the end surfaces of the block main body 21, and thus the endless circulation path for the balls 3 is completed in the moving block 2. Note that, the adjacent balls 3 housed in the endless circulation path are retained by a belt 31 made of a synthetic resin in order to maintain the aligned state of those balls 3 (see FIG. 1).

Further, the lid member 22 is provided with an oil filler port 22b for supplying lubricant oil to the endless circulation path for the balls 3. Further, the surface of the lid member 22 that abuts against the block main body 21 has a recessed portion 23 formed therein, to which a fitting portion of the inner seal 5 to be described later is loosely fitted. On both sides of the recessed portion 23, a pair of insertion grooves 24 for inserting leg portions of the inner seal 5 to be described later is formed along the moving direction of the moving block 2 (direction from the front side to the deep side in the drawing sheet of FIG. 2). Still further, in an outer side surface of the lid member 22, that is, the surface on the opposite side to the surface that abuts against the block main body 21, a receiving groove 25 to which the end seal 4 is fixed is formed.

Figure 4:
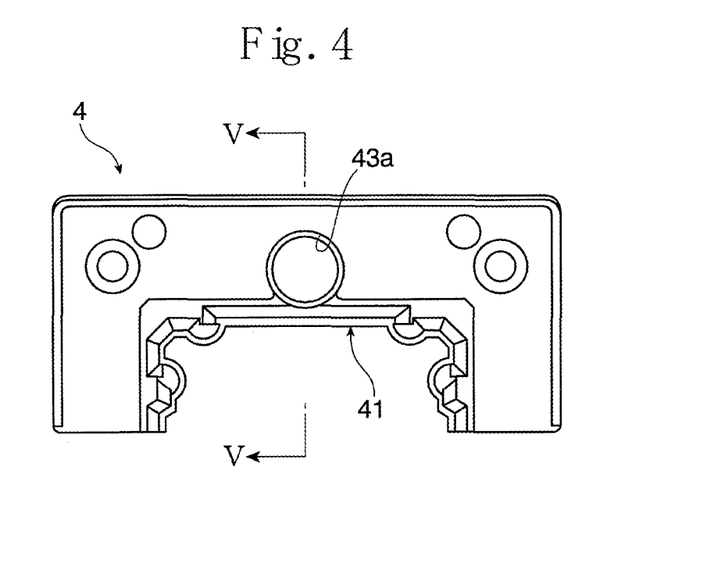
FIG. 4 is a front view illustrating an end seal included in the motion guide device to which the present invention is applied.
Figure 5:
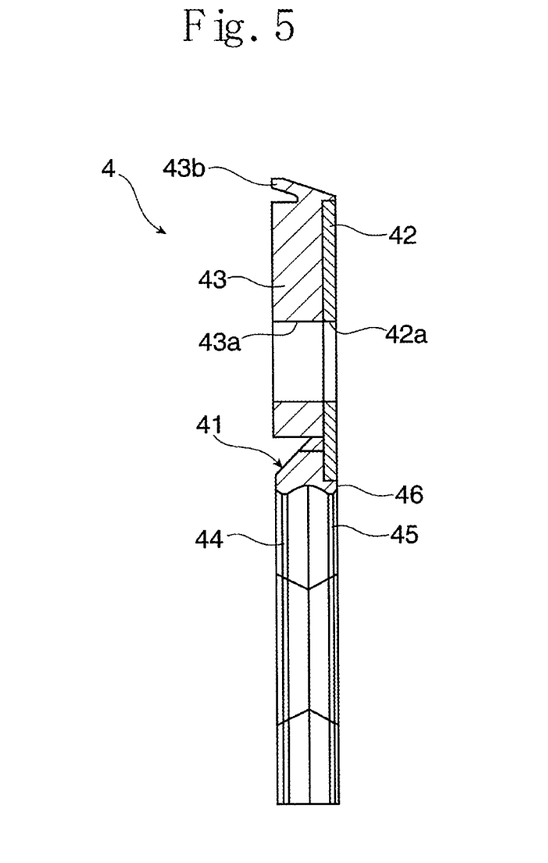
FIG. 5 is a sectional view taken along the line V-V of FIG. 4.

FIGS. 4 and 5 illustrate one of the pair of end seals 4 to be fixed to the lid member 22. FIG. 4 is a front view of the end seal 4, and FIG. 5 is a sectional view taken along the line V-V of FIG. 4. The end seal 4 is fixed with a fixation bolt to the receiving groove 25 of each of the lid members 22 from the front or rear side in the moving direction of the moving block 2. Further, the end seal 4 has a guide groove with a sectional shape that is slightly larger than the sectional shape of the track rail 1, and a seal portion 41 that comes into sliding contact with the surface of the track rail 1 is formed at the edge of the guide groove.

The end seal 4 includes a seal plate 42 serving as a fixation plate with respect to the moving block 2, and a seal main body 43 firmly fixed to the seal plate 42. The seal portion 41 forms a part of the seal main body 43. The seal plate 42 is made of a hard material such as a metal plate, while the seal main body 43 is made of an elastic material such as urethane rubber. The seal main body 43 is vulcanized and bonded to the seal plate 42. Those seal plate 42 and seal main body 43 respectively have through holes 42a and 43a formed to be communicated to the oil filler port 22b formed in the lid member 22. Further, at the peripheral edge of the seal main body 43, an elastically deformable fixing lip 43b that protrudes toward the outer side of the seal main body 43 is formed.

The seal portion 41 is brought into sliding contact with the upper surface and the side surfaces of the track rail 1, and also brought into sliding contact with the ball rolling surfaces formed in the track rail. Further, at a contact end of the seal portion 41 that comes into sliding contact with the track rail 1, seal lips 44 and 45 arranged in a doubled manner are provided. The seal lip 44, which is positioned on the outer side with respect to the moving block 2, is a dust lip, and mainly acts with respect to the matters adhering on the track rail 1 in the traveling direction of the moving block 2, to thereby remove the adhering matters from the track rail 1 along with the motion of the moving block 2. On the other hand, the seal lip 45, which is arranged in proximity to the moving block 2, is an oil lip, and prevents lubricant oil such as grease filled in the moving block 2 from adhering to the track rail 1 through the oil filler port 22b to flow out from the moving block 2.

Each of the seal lips 44 and 45 has a tapered leading end portion that abuts against the track rail 1, and the seal lips 44 and 45 are elastically deformed with ease. Thus, the surface pressure is prevented from increasing when the seal lip is brought into contact with the track rail 1. Further, a groove is formed between the dust lip 44 and the oil lip 45. The dust lip 44 and the oil lip 45 are independently brought into contact with the surface of the track rail 1. Further, the seal portion 41 has a flat surface 46 formed therein, which is continuous with the oil lip 45 and cooperates with the seal plate 42 to form a surface that is opposed to the moving block 2.

Figure 6:
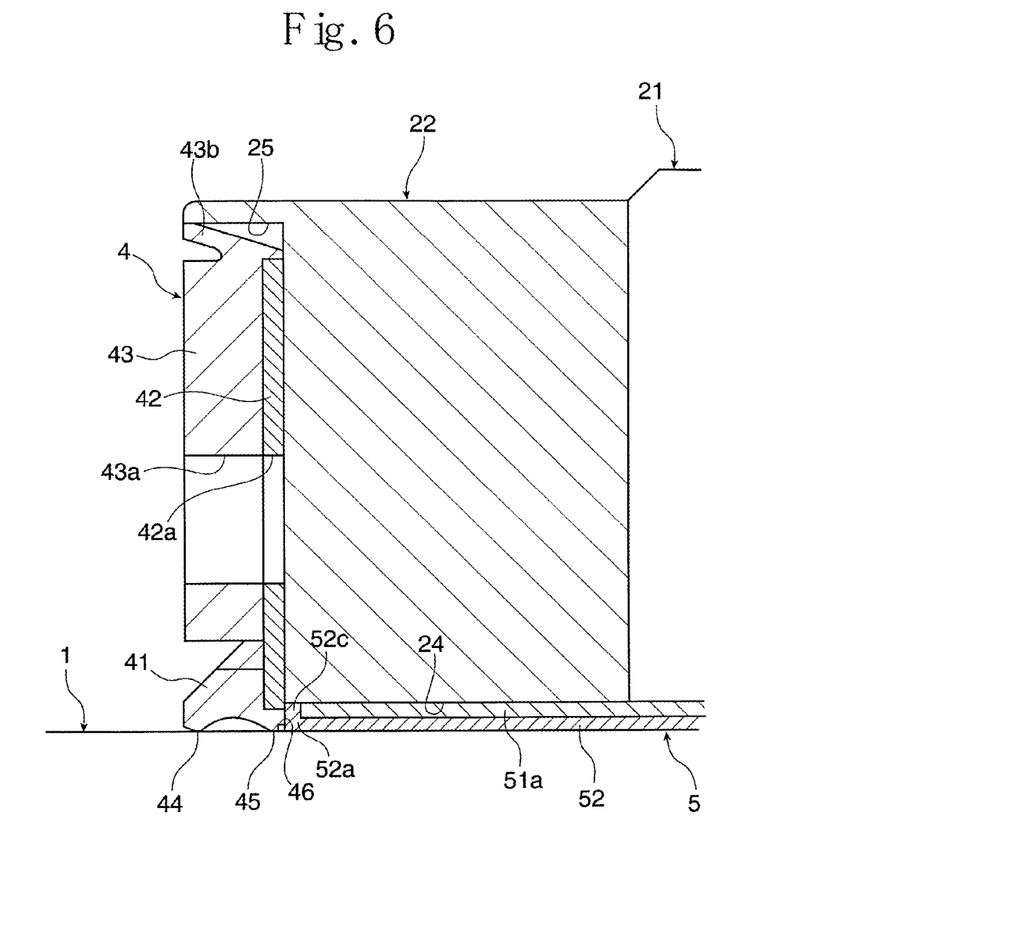
FIG. 6 is a sectional view illustrating an inner seal and the end seal in a state of being assembled to a moving block.

When each of the pair of end seals 4 configured as described above is received in the receiving groove 25 provided in each of the lid members 22, the fixing lip 43b provided in the seal main body 43 is brought into abutment against an inner peripheral wall of the receiving groove 25 of the lid member 22 to be elastically deformed. As a result, as illustrated in FIG. 6, when the end seal 4 is mounted into the receiving groove 25 of the lid member 22, the fixing lip 43b is brought into close contact with the inner peripheral wall of the receiving groove 25 so as to bias the inner peripheral wall, and water-tightness is secured between the end seal 4 and the lid member 22. With this, it is possible to prevent foreign matters from entering the moving block 2 from the periphery of the end seal 4.

When the moving block 2 having the end seal 4 fixed thereto as described above is moved along the track rail 1, the seal portion 41 provided in the end seal 4 functions to remove matters adhering on the track rail 1, and foreign matters adhering on the track rail 1 accumulate on an outer side of the dust lip 44 of the seal portion 41.

Figure 7:
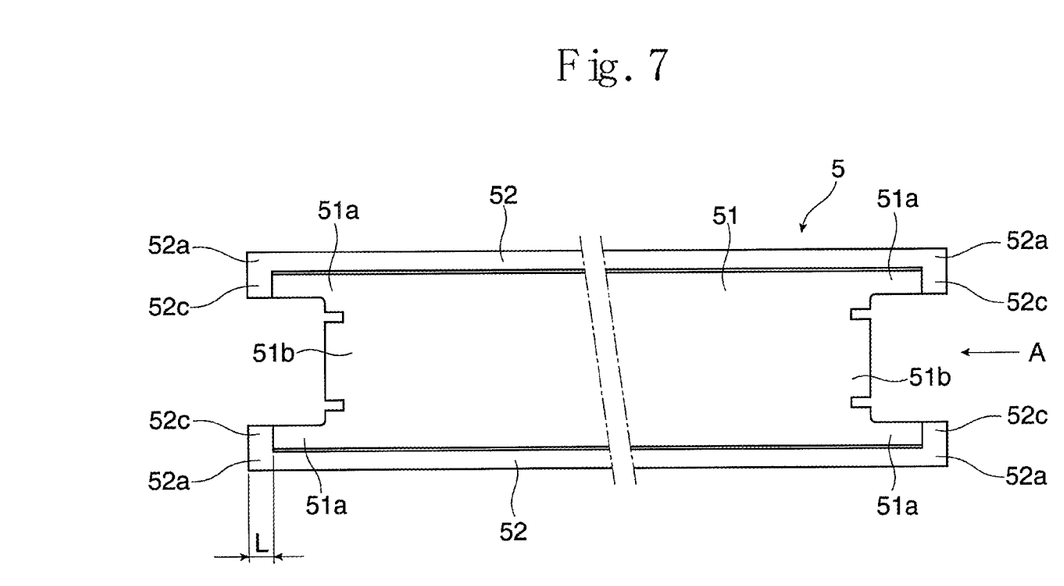
FIG. 7 is a plan view illustrating the inner seal included in the motion guide device to which the present invention is applied.
Figure 8:
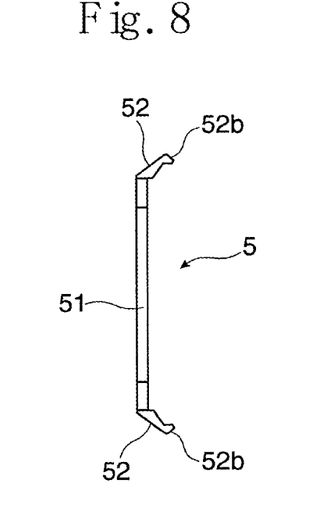
FIG. 8 is a view as viewed from the arrow A of FIG. 7.

Next, the inner seal 5 included in the motion guide device to which the present invention is applied is described. FIGS. 7 and 8 illustrate the inner seal 5. FIG. 7 is a plan view, and FIG. 8 is a view as viewed from the arrow A of FIG. 7. As illustrated in FIG. 1, the inner seal 5 is mounted to the lower surface of the moving block 2 at a position opposed to the upper surface of the track rail 1. The inner seal 5 includes a metallic fixing plate 51 serving as a fixing substrate, and a pair of seal portions 52. The fixing plate 51 has a width slightly smaller than the width of the upper surface of the track rail 1. The pair of seal portions 52 is provided along the long side of the fixing plate 51. The pair of seal portions 52 is made of an elastic material such as urethane rubber. The pair of seal portions 52 is formed and simultaneously vulcanized and bonded to the long sides of the fixing plate 51.

Leg portions 51a that protrude from both axial ends of the fixing plate 51 are formed in the fixing plate 51, and the leg portions 51a are protruded in pairs from each end portion of the fixing plate 51. That is, a total of four leg portions 51a are formed in the fixing plate 51. Further, a fitting portion 51b that is loosely fitted to the recessed portion 23 provided in the lid member 22 is formed between the pair of leg portions 51a provided in each end of the fixing plate 51.

On the other hand, each of the seal portions 52 is provided from the above-mentioned one leg portion 51a to another leg portion 51a along the long side of the fixing plate 51. Further, each of the seal portions is provided along the ball rolling surface 11 of the track rail 1. Each of the seal portions 52 abuts against the upper surface of the track rail 1 provided with the insertion holes 12, and the insertion holes 12 of the track rail 1 are located between the pair of seal portions 52. That is, the fixing plate 51 having the pair of seal portions 52 vulcanized and bonded thereto is arranged so as to cover the insertion holes 12 of the track rail 1 from above.

Further, each of the seal portions 52 includes a pair of extended seal portions 52a protruding from the end portions of the respective leg portions 51a in the longitudinal direction of the fixing plate 51. The axial length of each seal portion 52 including those extended seal portions 52a is set to be larger than the entire length of the fixing plate 51 including the pairs of leg portions 51a. Further, the leading end of each seal portion 52 that comes into contact with the upper surface of the track rail 1 is formed as a tapered seal lip portion 52b so as to prevent increase of the surface pressure when the leading end comes into contact with the track rail 1. The seal lip portion 52b is formed across the entire length of the seal portion 52 including the pair of extended seal portions 52a, and the seal lip portion 52b is formed to have a uniform sectional shape across the entire longitudinal length of the seal portion 52.

Further, the end surface of the leg portion 51a of the fixing plate 51 is covered with an extended end portion 52c formed integrally with the extended seal portion 52a, and the seal lip portion 52b is not formed in the extended end portion 52c. Note that, in the example illustrated in FIGS. 7 and 8, only the single seal lip portion 52b is provided to the seal portion 52 and the extended seal portions 52a, but in order to further improve the dust preventing effect, a doubled seal lip structure may be employed.

Under a state in which the inner seal 5 as described above is assembled to the moving block 2, the fitting portions 51b provided at both the ends of the fixing plate 51 are loosely fitted to the recessed portions 23 provided in the lid members 22. By fixing the pair of lid members 22 to the block main body 21, both ends of the inner seal 5 are supported by the pair of lid members 22. That is, the inner seal 5 is configured so as to be locked to the pair of lid members 22. In this case, when the axial length of the fixing plate 51, particularly, the axial length from one fitting portion 51b to the other fitting portion 51b is larger than the axial length from one lid member 22 to the other lid member 22, the inner seal 5 and the lid members 22 interfere with each other, and hence the pair of lid members 22 cannot be assembled to the block main body 21. Therefore, considering that there are tolerances in its processing in the fixing plate 51 and the lid members 22, the processing tolerance of the axial length of the fixing plate 51 is set to a negative value. Therefore, under a state in which the moving block 2 retains the inner seal 5 with use of the lid members 22, there is a case where a slight gap is present between the fixing plate 51 and the lid member 22. In this case, in the moving direction of the moving block 2, the displacement of the inner seal 5 with respect to the moving block 2 is slightly allowed.

Further, under a state in which the fitting portions 51b of the inner seal 5 are fitted to the recessed portions 23 of the lid members 22 as described above, as illustrated in FIG. 6, each leg portion 51a constituting the inner seal 5 and the seal portion 52 firmly fixed to the leg portion 51a are located inside the insertion groove 24 formed in the lid member 22, and the extended seal portion 52a continuous with the seal portion 52 and the extended end portion 52c covering the end portion of the leg portion 51a are arranged so as to come into close contact with the end seal 4.

In this case, considering the tolerance in its processing of the axial length of the block main body 21, the tolerance in its processing of the axial length of each of the lid members 22, and the tolerance in its processing of the axial length of the fixing plate 51 including the pairs of leg portions 51a, an axial length L (see FIG. 7) of each of the extension seal portion 52a and the extended end portion 52c is set to be larger than the cumulative value of those tolerances in processing.

Therefore, when the pair of end seals 4 is fixed to the moving block 2 having the inner seal 5 assembled thereto, as illustrated in FIG. 6, the extended seal portion 52a and the extended end portion 52c vulcanized and bonded to the leg portion 51a of the inner seal 5 are brought into close contact with the flat surface 46 and the metal surface of the seal plate 42 provided in the end seal 4. That is, by fixing the end seal 4 to the moving block 2, the extended seal portion 52a and the extended end portion 52c are compressed so as to reliably bring the seal portion 52 of the inner seal 5 into close contact with the seal portion 41 of the end seal 4 without a gap.

On the other hand, the motion guide device to which the present invention is applied is not always used in a manner that the track rail 1 is installed on a horizontal surface. The track rail 1 is used in a manner that the track rail 1 is installed on a wall surface in many cases. In such cases, refuse and coolant easily adhere on the side surfaces of the track rail 1 having the ball rolling surfaces 11 formed therein, and those adhering matters may enter the moving block 2 from gaps between the moving block 2 and the side surfaces of the track rail 1. Therefore, in such a usage environment, as illustrated in FIG. 1, it is preferred that a side seal 6 for closing the gap between the side surface of the track rail 1 and the moving block 2 be provided along the longitudinal direction of the track rail 1. When this side seal 6 is provided, it is possible to prevent matters adhering on the side surface of the track rail 1 from entering the moving block 2.

Figure 9:
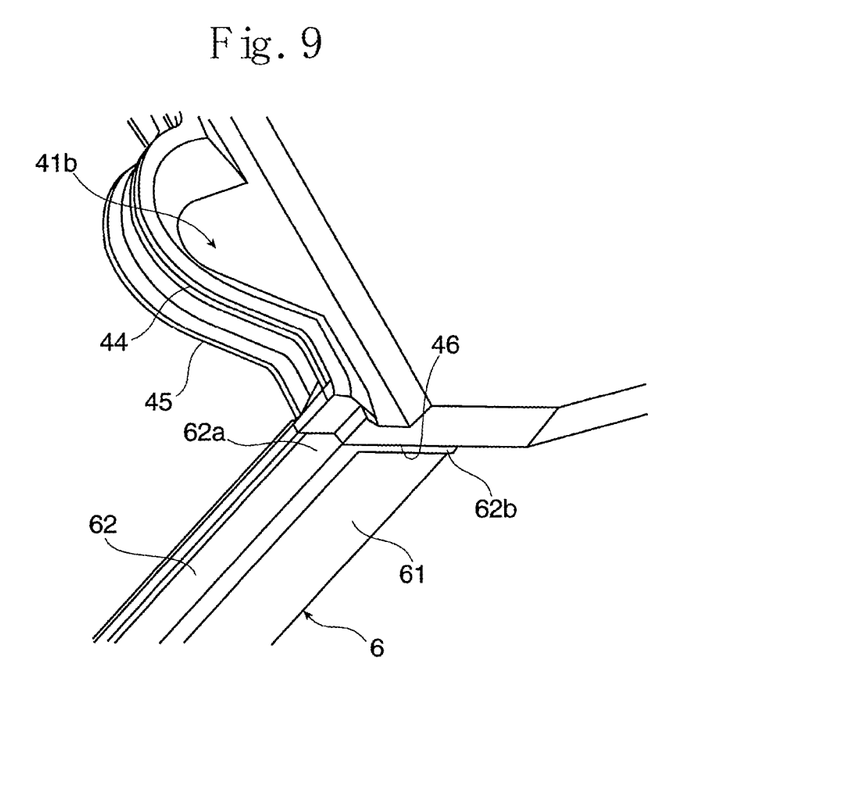
FIG. 9 is a perspective view illustrating a connection part between the end seal and a side seal.

The side seal 6 has a configuration similar to that of the inner seal 5. As illustrated in FIG. 9, the side seal 6 includes a metallic fixing plate 61 serving as a substrate, and a seal portion 62 provided along the long side of the fixing plate 61. The seal portion 62 is made of an elastic material such as urethane rubber, and is formed and simultaneously vulcanized and bonded to the long side of the fixing plate 61. An extended seal portion 62a for closing the gap between the side seal 6 and the end seal 4 is formed in the seal portion 62 of the side seal 6 similarly to the seal portion 52 of the inner seal 5. Further, an extended end portion 62b formed integrally with the extended seal portion 62a covers each of both longitudinal end surfaces of the fixing plate 61.

Under a state in which the side seal 6 configured as described above is arranged between the pair of end seals 4, the extended seal portion 62a and the extended end portion 62b are compressed to be brought into close contact with the flat portion 46 and the metal surface of the seal plate 42 provided in the end seal 4, and thus the gap between the end seal 4 and the side seal 6 is eliminated. That is, the side seal 6 as well as the above-mentioned inner seal 5 is a member corresponding to a second seal member of the present invention.

When the side seal 6 and the end seal 4 are connected to each other as described above, together with the connection structure between the inner seal 5 and the end seal 4 described above, a sealing structure can be provided so as to surround the load rolling surfaces of the moving block 2. That is, a region in which the balls 3 roll on the track rail 1 is surrounded by the end seals 4, the inner seal 5, and the side seals 6 that are brought into close contact with each other. In this manner, matters adhering on the track rail 1 are prevented from entering the rolling region.

Figure 10:
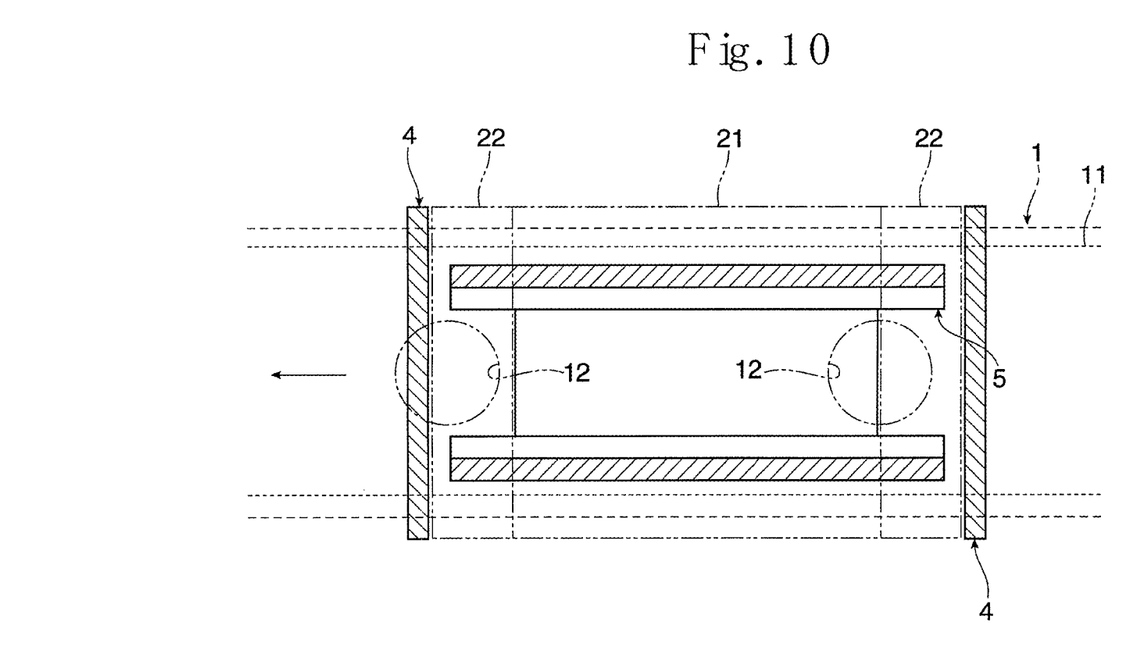
FIG. 10 is a schematic view illustrating a connection part between the end seal and the inner seal in a related-art motion guide device.

FIG. 10 is a schematic view illustrating a related-art motion guide device. When designing such a related-art motion guide device, it is necessary to match the entire length of the moving block 2 including the block main body 21 and the pair of lid members 22 with the axial length of the inner seal 5 so as to prevent gaps from being generated between the inner seal 5 and the pair of end seals 4. However, there are tolerance in its processing in the block main body 21 and the lid members 22, and hence when the cumulative value of the tolerances in its processing in the entire length of the moving block 2 is a negative value, both ends of the fixing plate of the inner seal 5 slightly protrude from the moving block when the moving block is assembled. Therefore, due to the interference with the fixing plate, it may be impossible to assemble the end seals 4 to the moving block 2. In order to avoid such a situation, in the related-art motion guide device, the processing tolerance of the axial length of the inner seal 5 is set to a negative value.

When the processing tolerance of the axial length of the inner seal 5 is set to a negative value, the assembly of the moving block 2 itself is facilitated for the reason described above, but a case where the entire length of the inner seal 5 becomes small than that of the moving block 2 occurs, and as illustrated in FIG. 10, there is a risk that gaps are formed between the pair of end seals 4 and both longitudinal ends of the inner seal 5.

In a case where such gaps are present, when the moving block 2 moves in the arrow direction indicated in FIG. 10 along the track rail 1, almost all of the foreign matters adhering on the surface of the track rail 1 are wiped by the end seal 4 (end seal 4 on the left side in FIG. 10) arranged on the front side in the traveling direction of the moving block 2, and do not enter the moving block 2. On the other hand, fine foreign matters accumulated at a boundary between the insertion hole 12 and the closing cap that closes the insertion hole 12 pass below the end seal 4 to adhere on the oil lip 45 of the other end seal 4 (end seal 4 on the right side in FIG. 10) located on the rear side in the traveling direction of the moving block 2, and gradually accumulate along with use of the motion guide device over time.

As the usage time of the motion guide device accumulates under this state, finally, the foreign matters accumulated on the oil lip 45 may enter the moving block 2 through the gap between the inner seal 5 and the end seal 4 illustrated on the right side in FIG. 10. This event may occur also between the inner seal 5 and the end seal 4 illustrated on the left side in FIG. 10 when the moving block 2 moves in a direction opposite to that of the arrow indicated in FIG. 10. Note that, in FIG. 10, for easy understanding of the gap between the end seal 4 and the seal portion 52 constituting the inner seal 5, the configuration of the inner seal 5 and the end seal 4 is represented by solid lines, and the seal portion 52 and the end seal 4 are hatched. On the other hand, the configuration other than the seal portion 52 and the end seal 4 is represented by chain lines.

Figure 11:
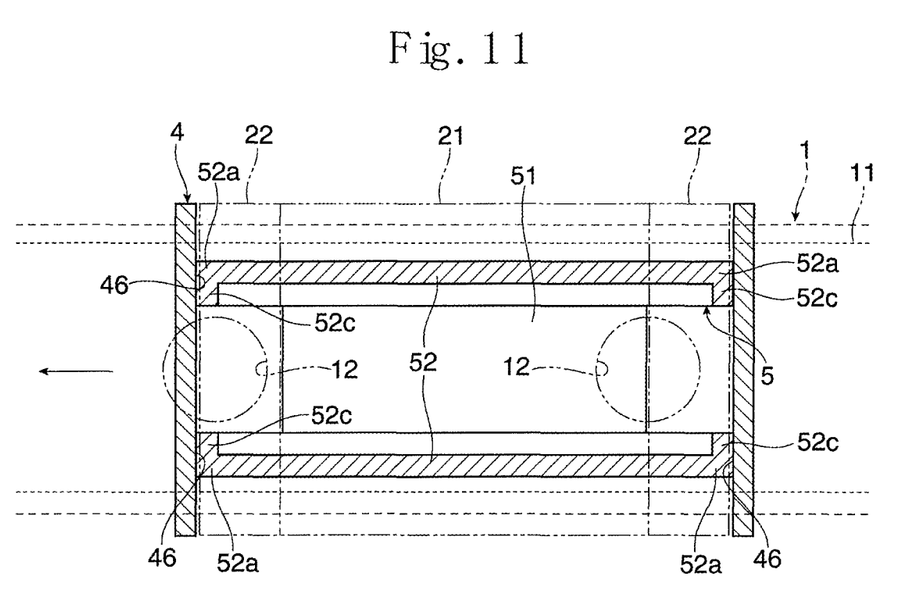
FIG. 11 is a schematic view illustrating a connection part between the end seal and the inner seal in the motion guide device to which the present invention is applied.

In contrast, in the motion guide device to which the present invention is applied, as illustrated in FIG. 11, the extended seal portions 52a are formed at both the ends of the seal portion 52 of the inner seal 5, and under a state in which the pair of end seals 4 is fixed to the lid members 22 of the moving block 2, the extended seal portions 52a are compressed to be brought into close contact with the end seals 4. As a result, the gap between the inner seal 5 and the end seal 4 is completely eliminated. Note that, also in FIG. 11, similarly to FIG. 10, for easy understanding of the close contact relationship between the end seal 4 and the extended seal portion 52a of the inner seal 5, the configuration of the inner seal 5 and the end seal 4 is represented by solid lines, and the extended seal portion 52a and the extended end portion 52c of the inner seal 5, the seal portion 52 that comes into sliding contact with the surface of the track rail 1, and the end seal 4 are hatched. On the other hand, the configuration other than those extended seal portion 52a, extended end portion 52c, seal portion 52, and end seal 4 is represented by chain lines.

When the moving block 2 moves in the arrow direction indicated in FIG. 11 along the track rail 1, foreign matters adhering on the surface of the track rail 1 accumulate on the end seal 4 (end seal 4 on the left side in FIG. 11) arranged on the front side in the traveling direction of the moving block 2. On the other hand, fine foreign matters accumulated at a boundary between the insertion hole 12 and the closing cap pass below the end seal 4 arranged on the front side in the traveling direction of the moving block 2 to adhere on the oil lip 45 of the other end seal 4 (end seal 4 on the right side in FIG. 11) located on the rear side in the traveling direction of the moving block 2, and gradually accumulate along with use of the motion guide device over time.

As the usage time of the motion guide device accumulates under this state, although foreign matters accumulate in a space defined by the end seal 4 on the right side in FIG. 11 and the seal portions 52 of the inner seal 5, the extended seal portions 52a of the inner seal 5 are brought into close contact with the flat surface 46 of the end seal 4, and hence there is no gap that allows foreign matters to pass between the inner seal 5 and the end seal 4. In this manner, it is possible to prevent foreign matters adhering on the surface of the track rail 1 from entering the moving block 2, that is, from entering a region in which the balls 3 roll through a gap between the inner seal 5 and the end seal 4. As a matter of course, even when the moving block 2 moves in a direction opposite to the arrow direction indicated in FIG. 11, it is possible to prevent matters adhering on the track rail 1 from entering the moving block 2.

As a result, it is possible to prevent matters adhering on the track rail 1, particularly, fine foreign matters accumulated in a gap between the closing cap and the insertion hole 12 of the track rail 1 from entering the moving block 2. As a result, it is possible to prevent abrasion and damage on the ball rolling surface 11 of the track rail 1, the load rolling surface of the moving block 2, or on the ball 3 itself. In this manner, a smooth motion of the moving block 2 with respect to the track rail 1 can be achieved.

Further, in the motion guide device to which the present invention is applied, both the longitudinal ends of the inner seal 5, specifically, the end surfaces of the leg portions 51a of the fixing plate 51 are covered with the extended end portions 52c, and hence when the end seals 4 are fixed to the moving block 2, the extended end portions can be reliably compressed between the leg portions 51a of the fixing plate 51 and the seal plates 42 of the end seals 4. With this, the gap between the inner seal 5 and the end seal 4 can be further reliably eliminated, and thus it is possible to prevent foreign matters from entering the moving block 2.

Further, the extended end portion 52c is integrally provided with the extended seal portion 52a, and hence the extended end portion 52c also has a function of reinforcing the extended seal portion 52a. Therefore, when the extended seal portion 52a is compressed between the fixing plate 51 and the end seal 4, the bending of the extended seal portion 52a is prevented due to the presence of the extended end portion 52c. Therefore, even when the extended seal portion 52a is brought into close contact with the end seal 4 to be compressed, the sliding contact state of the seal lip portion 52b provided in the extended seal portion 52a with respect to the surface of the track rail 1 is maintained, and thus the sealing performance of the inner seal 5 with respect to the track rail 1 can be secured.

On the other hand, also in the motion guide device to which the present invention is applied, from the viewpoint of eliminating assembly failure of the motion guide device due to the tolerance in its processing in the fixing plate 51, the processing tolerance of the axial length of the fixing plate 51 is set to a negative value. Depending on the actual processing accuracy, a slight gap may be generated between the fixing plate 51 of the inner seal 5 and the pair of lid members 22 for retaining the inner seal 5 with respect to the moving block 2. As a result, the fixing plate 51 of the inner seal 5 may be slightly displaceable with respect to the moving block 2.

However, when the pair of end seals 4 is fixed to the front and rear sides of the moving block in its moving direction, the extended seal portion 52a and the extended end portion 52c of the inner seal 5 are brought into close contact with the flat surface 46 and the seal plate 42 formed in the end seal 4 to be compressed. Therefore, even when a negative tolerance in its processing occurs during actual processing of the fixing plate 51, no gap is generated between the inner seal 5 and the end seal 4, and it is possible to reliably prevent foreign matters from entering the moving block 2.

Further, in the motion guide device to which the present invention is applied, when the end seal 4 is fixed to the moving block 2, the extended seal portion 52a and the extended end portion 52c of the inner seal 5 are compressed to be brought into close contact with the end seal. Therefore, it can be recognized that those extended seal portion and extended end portion absorb the tolerances in its processing in the moving block and the inner seal, and even when there are tolerances in its processing in the inner seal 5 and the block main body 21 and the lid members 22 constituting the moving block 2, the moving block can be easily assembled.

Note that, in the motion guide device to which the present invention is applied according to the above-mentioned embodiment, an example that uses a ball as the rolling element is described, but a motion guide device using a roller or the like as the rolling element is also applicable.

Figure 12:
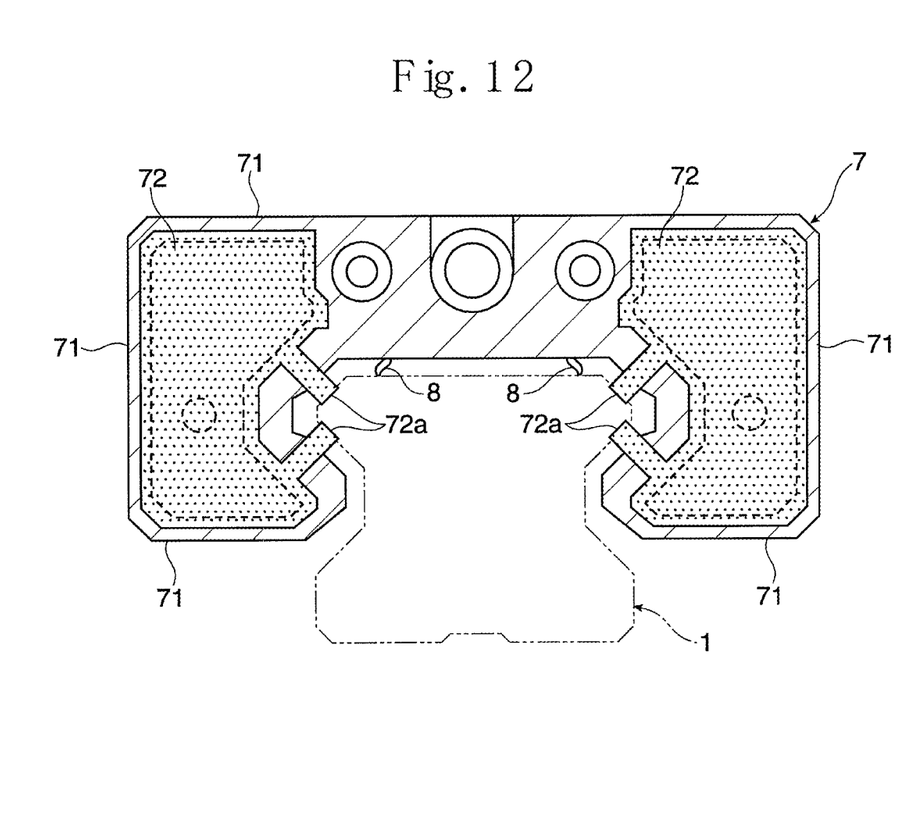
FIG. 12 is a front sectional view illustrating a lubricant oil supply device that can be applied to the motion guide device illustrated in FIG. 1.

In the motion guide device according to the above-mentioned embodiment, from the viewpoint of preventing abrasion and damage on the ball rolling surface 11 of the track rail 1, the load rolling surface of the moving block 2, or on the ball 3 itself, it is necessary to appropriately lubricate the balls 3 and the rolling surfaces in accordance with the usage conditions, and the lubrication of those balls 3 and rolling surfaces is performed by a lubricant oil supply device as illustrated in FIG. 12 in many cases.

The above-mentioned lubricant oil supply device 7 includes a casing 71 to be mounted to the lid member 22 of the moving block 2, and applying members 72 that are stored in the casing 71 and abut against the ball rolling surfaces 11 of the track rail 1 to supply lubricant oil to the track rail 1. Applying pieces 72a are formed in the applying members 72 so as to apply the lubricant oil stored in the applying members 72 to the ball rolling surfaces 11 of the track rail 1.

Figure 13:
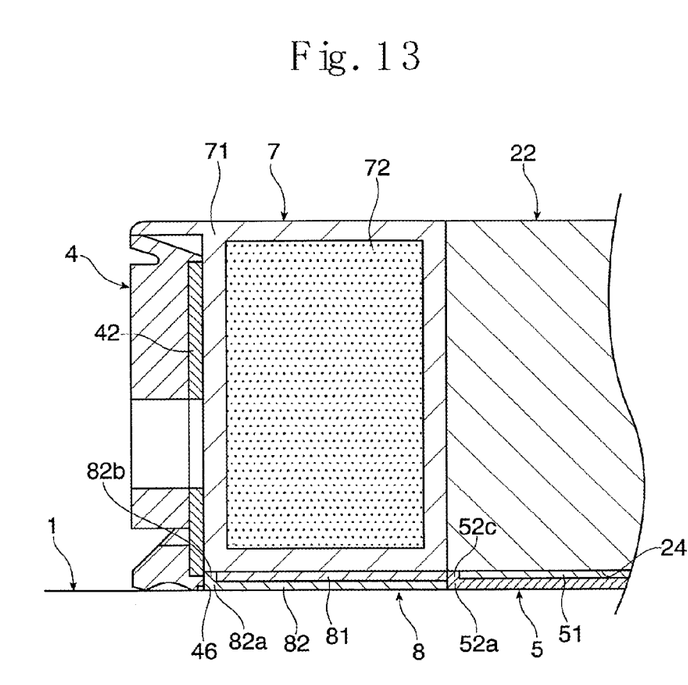
FIG. 13 is a schematic view illustrating a connection part between the lubricant oil supply device illustrated in FIG. 12 and a lid member as well as the end seal of the moving block.

The lubricant oil supply device 7 configured as described above is, as illustrated in FIG. 13, mounted to the lid member 22 of the moving block 2 from the outer side in the moving direction of the moving block 2. The end seal 4 is fixed to the lubricant oil supply device 7 from the outer side in the moving direction of the moving block 2.

In this case, when a gap is formed between the extended seal portion 52a of the inner seal 5 and the lubricant oil supply device 7, foreign matters adhering on the track rail 1 may enter the moving block 2 through the gap. Therefore, when the lubricant oil supply device 7 is used, it is preferred that, as illustrated in FIG. 12, a pair of extended inner seals 8 to be coupled to the extended seal portion 52a and the extended end portion 52c of the inner seal 2 be provided at a lower surface of the lubricant oil supply device 7, that is, at a position opposed to the upper surface of the track rail 1.

Each of the extended inner seals 8 is provided along the ball rolling surface 11 formed in the track rail 1, and includes a fixing plate 81 and a seal portion 82 firmly fixed to the fixing plate 81. Further, an end surface of the seal portion 82 on the end seal 4 side has a configuration similar to those of the extended seal portion 52a and the extended end portion 52c of the inner seal 5, and an extended seal portion 82a protruding from the fixing plate 81 in the longitudinal direction and an extended end portion 82b covering an axial end surface of the fixing plate 81 are formed. Between the pair of extended inner seals 8 configured as described above, the insertion holes 12 of the track rail 1 are located.

When the lubricant oil supply device 7 configured as described above is mounted to the lid member 22 of the moving block 2, the extended seal portion 52a and the extended end portion 52c of the inner seal 5 are compressed to be brought into close contact with the end surface of the extended inner seal 8 on the moving block side provided in the lubricant oil supply device 7, and thus the gap between the extended inner seal 8 and the inner seal 5 is eliminated. On the other hand, when the end seal 4 is mounted to the lubricant oil supply device 7, the extended seal portion 82a and the extended end portion 82b of the extended inner seal 8 are compressed and brought into close contact with the flat surface 46 and the metal surface of the seal plate 42 of the end seal 4, and thus the gap between the extended inner seal 8 and the end seal 4 is eliminated.

With such a configuration of the extended inner seal 8 of the lubricant oil supply device 7, a gap can be prevented from being generated between the inner seal 5 and the end seal 4. As a result, foreign matters can be prevented from entering the moving block 2. That is, the extended inner seal 8 provided to the lubricant oil supply device 7 is coupled to the inner seal 5 so as to constitute a single inner seal.

The invention claimed is:
1. A motion guide device, comprising:
a track shaft having a rolling surface for rolling elements formed along a longitudinal direction thereof;
a moving member that is assembled to the track shaft through intermediation of a large number of the rolling elements and has an endless circulation path for the rolling elements, the moving member being freely movable along the track shaft;
a pair of first seal members that is mounted to both end surfaces of the moving member in a moving direction thereof and comes into sliding contact with a surface of the track shaft so as to close a gap between the track shaft and the moving member; and
a second seal member that is provided along the rolling surface of the track shaft and comes into sliding contact with the surface of the track shaft so as to close the gap between the track shaft and the moving member,
wherein the second seal member comprises:
a fixing substrate locked to the moving member; and
a seal portion that is firmly fixed to the fixing substrate along the rolling surface of the track shaft, the seal portion comprising a seal lip portion that comes into sliding contact with the surface of the track shaft, the seal portion having both longitudinal ends that come into close contact with the pair of first seal members under a state in which the pair of first seal members is fixed to the moving member,
wherein the seal portion further comprises a pair of extended seal portions that protrudes in a longitudinal direction of the fixing substrate from both longitudinal ends of the fixing substrate, wherein the pair of extended seal portions is compressed under the state in which the pair of first seal members is fixed to the moving member, wherein the seal portion is integrally formed with the pair of extended seal portions, and wherein the seal portion further comprises an extended end portion formed so as to cover an end portion of the fixing substrate from the longitudinal direction of the fixing substrate.

2. The motion guide device according to claim 1, wherein the moving member comprises:

a moving member main body having a load rolling element rolling surface and a rolling element return hole formed therein, the load rolling element rolling surface being opposed to the rolling surface formed in the track shaft so as to form a load rolling element path, the rolling element return hole being configured to circulate the rolling elements; and a pair of lid members fixed to both end surfaces of the moving member main body in a moving direction thereof, and wherein the fixing substrate is locked to the pair of lid members from both longitudinal ends thereof when the pair of lid members is fixed to the moving member main body.

\* \* \* \* \*